United States Patent [19]

Gates

[11] 4,196,319

[45] Apr. 1, 1980

[54] VEHICULAR TELEPHONE STATION SET SECURITY PEDESTAL

[75] Inventor: Frank V. Gates, Succasunna, N.J.

[73] Assignee: Bell Telephone Laboratories, Incorporated, Murray Hill, N.J.

[21] Appl. No.: 967,734

[22] Filed: Dec. 8, 1978

[51] Int. Cl.² .............................................. H04M 1/04
[52] U.S. Cl. ............................ 179/146 R; 179/1 VE; 179/189 R
[58] Field of Search ............ 179/1 VE, 146 R, 189 R, 179/147

[56] References Cited

U.S. PATENT DOCUMENTS

| | | | |
|---|---|---|---|
| 2,495,006 | 1/1950 | Holmes | 179/146 R |
| 2,615,322 | 10/1952 | Gazda | 179/189 R |
| 3,099,797 | 7/1963 | Piccinini | 325/312 |
| 3,898,394 | 8/1975 | Ward et al. | 179/146 R |
| 4,056,696 | 11/1977 | Meyerle et al. | 179/100 R |

FOREIGN PATENT DOCUMENTS 433304  8/1935  United Kingdom ................ 179/189 R

*Primary Examiner*—George G. Stellar
*Attorney, Agent, or Firm*—John Francis Moran

[57] ABSTRACT

A dual position mount is disclosed for mobile radio telephone sets. The base (11) of the mount is hollow and has an access port (28). The interior position (29) of the base serves as a secure receptacle for the mobile radio control unit when it is not being used. A lock (31) prevents removal of the control unit. For operation, the control unit is mounted on a connector plate (19) which is supported by means of an adjustable mechanical coupling (16 and 17) while a conductor (41) is fed through the center of the coupling to complete the circuitry between the control unit and the remaining portions of the mobile radio.

10 Claims, 7 Drawing Figures

VEHICULAR TELEPHONE STATION SET SECURITY PEDESTAL

BACKGROUND OF THE INVENTION

This invention relates to telephone subscriber station sets and, more particularly, it relates to arrangements for mounting such sets utilized as mobile radio telephone sets.

Many forms of telephone station sets are known in the art among which most are the type that are freestanding and are connected to the end of a wire. These sets may be placed in a convenient location chosen by the subscriber. Such locations are known in the art to include, for example, concealed locations.

In the environment of an automobile, the location of the telephone station set and its mounting arrangement take on special significance. A paramount consideration is the convenience of the station set, also known as the control unit portion of the mobile radio unit, to the subscriber who may in fact be the operator of the vehicle. Furthermore, the location of the station set should present minimal distraction to the user of the set. Another consideration is that the telephone station set should be relatively secure in the event of sudden changes in direction or speed of the vehicle such as encountered during accidents. In this situation, the telephone set must not become a moving projectile and conversely it should not be a rigid object capable of inflicting harm to the user by not yielding during impact. Also, the telephone station set should not vibrate excessively during normal vehicle motion and should not be easily removed from the vehicle thereby affording some degree of protection from theft. Furthermore, the mounting arrangement for the telephone station set should not have its practicality susceptible to style changes in automobiles.

One approach that satisfies some of these considerations is to utilize a panel type arrangement and have it serve as the sun visor in the vehicle. Such an arrangement is disclosed in U.S. Pat. No. 4,056,696 issued on Nov. 1, 1977 to J. A. Meyerle et al. A fair segment of users are comfortable with this arrangement, but others object to it, so that other alternatives should be made available.

An object of this invention is to provide a mounting arrangement for a mobile radio station set wherein a receptacle stores the unit in a secure manner when it is not being used.

Another object of the invention is to provide a station set, or control unit, mount which provides some protection against vibration which may be transmitted to it from the vehicle.

Still another object of the invention is to allow the set to move slightly under severe impact so as to reduce injury from its presence during a vehicular collision.

SUMMARY OF THE INVENTION

The invention utilizes an arrangement for supporting at least the control unit portion of a telephone station set which mounts to a substantially planar region of a surface in a vehicle and includes a base having an interior cavity accessible by an opening or port. The cavity with an associated lock serves as a secure receptacle for storing the inactive set to prevent its theft particularly when the vehicle is not occupied. A disengagable connector assembly adapted to mate with the set and make it capable of operation extends from the exterior of the base to provide mechanical support and electrical coupling.

In some aspects of the invention, the base is constructed of a resilient material to dampen vibration and absorb severe shock when the control unit is mounted for operation. The contact of the base to the vehicle surface is over a substantial area in relation to overall height to provide a geometry which minimizes susceptibility to vibration occasioned by vehicle operation. The cavity accommodates the set with its handset in a cradle.

In some further aspects of the invention, an adjustable ball and socket joint with a lock supports the connector assembly. The lock for the base includes a rotatable latch for obstructing withdrawal of the control unit when the lock is set. An intermediate member between the base and the vehicle surface provides a mount secured with concealed fasteners when the control unit is in the stowage position.

BRIEF DESCRIPTION OF THE DRAWINGS

Features of the invention and additional objects of the invention will be more readily appreciated and better understood by reference to the following detailed description which should be considered in conjunction with the following drawings.

DETAILED DESCRIPTION

Figure 2:
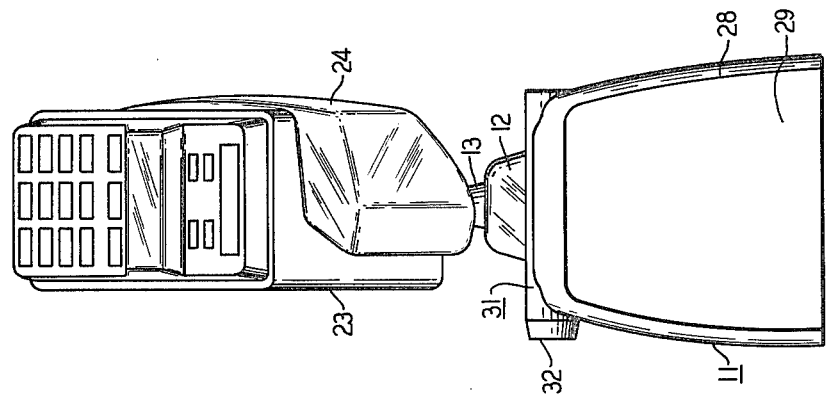
FIG. 2 is a front view of the assembly of FIG. 1 illustrating the opening which provides access to the cavity.
Figure 1:
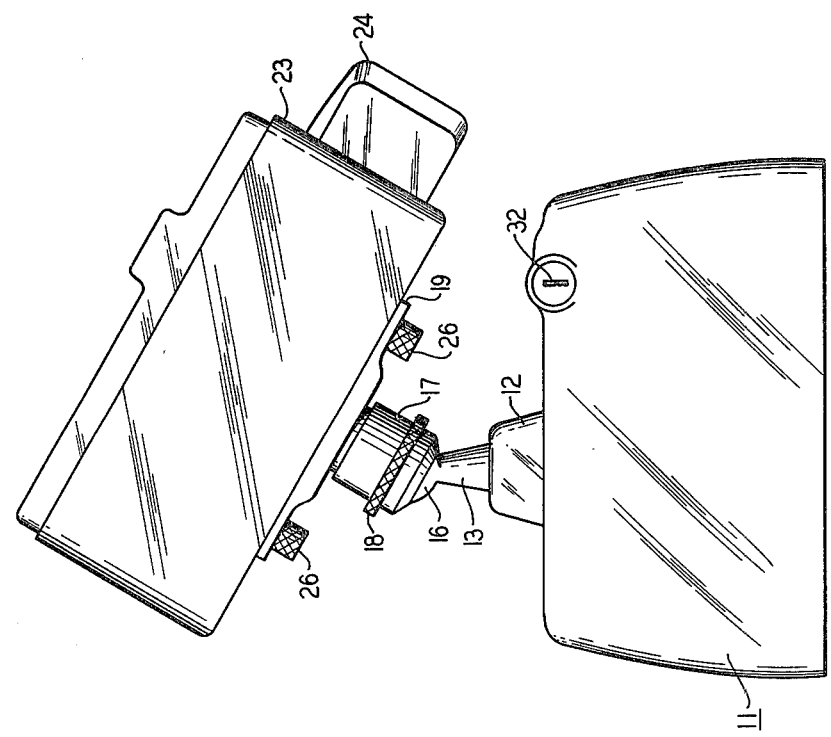
FIG. 1 is a side view of an assembly of a pedestal including a mobile telephone set in the operating position.

In FIGS. 1-4, assembly views are utilized to depict an illustrative embodiment of the invention. FIGS. 1 and 2 illustrate the operating position of the telephone set proper while FIGS. 3 and 4, which utilize partial sectioning, illustrate the secured stowage feature of the invention. Although shown from different perspectives and positions, components common throughout FIGS. 1-4 are designated with the same reference numerals.

In FIG. 1, base 11 which is designed to be secured to the floor of a vehicle as will be discussed hereinafter, includes collar 12 wherein stem 13 is mounted. Stem 13 is terminated by spherical ball 16 which fits into socket 17. As is well known in the art, this coupling provides free turning in any direction within limits defined by the geometry of the coupled components and the coupling itself. Activation of locking collar 18 on socket 17 freezes the coupling to provide rigid support for connector plate 19 in any convenient operating position within these limits. Connector plate 19 provides both mechanical support and electrical coupling for control unit 23 and handset 24 which is shown in its cradle. Telephone set 23 is disclosed in Design Patent Application Ser. No. 789,737 filed in the name of R. R. Stokes on Apr. 21, 1977, and of common assignee herewith. Although connector plate 19 is shown secured to control unit 23 by thumb screws 26, it should be understood that a number of so-called "quick connecting" arrangements may be utilized. Particularly suitable are those designed to provide convenient one-hand operation.

The construction material of base 11 is of paramount importance since its selection provides a number of features characteristic of the inventive principles. In particular, base 11 may be made of a urethane elastomer such as one of a variety of materials manufactured by Dupont Inc., under the name of ADIPRENE. By appropriately selecting the chemical mix of the material, base 11 can be made sufficiently rigid to hold the telephone set in place during normal operation, but at the same time limit the amount of vehicular vibration transmitted to it. It should also be pointed out that base 11 provides a perimeter contact which spans a relatively large floor area of the vehicle. This further reduces susceptibility to vibration.

Another consideration in the material selection of base 11 involves safety considerations. Specifically, the elastomer will allow base 11 to deform but not break apart during impact forces experienced in vehicular accidents. Thus telephone set 23 will yield and reduce serious personal injury to occupants of the vehicle because of its presence. It should be understood that this safety consideration may be readily met without compromising the security stowage feature.

FIG. 2 shows base 11 and telephone set 23 from another perspective in order to view opening or port 28 in the base. Opening 28 provides access to interior cavity 29 of base 11. Also included integrally with base 11 is lock assembly 31. Lock assembly 31 is situated to restrict the opening of port 28. When telephone set 23 is placed via port 28 in interior 29, it serves as a receptacle with lock 31 preventing its removal. Lock 31 is key operated via keyhole 32 which is more clearly seen in the side view of FIG. 1.

Figure 3:
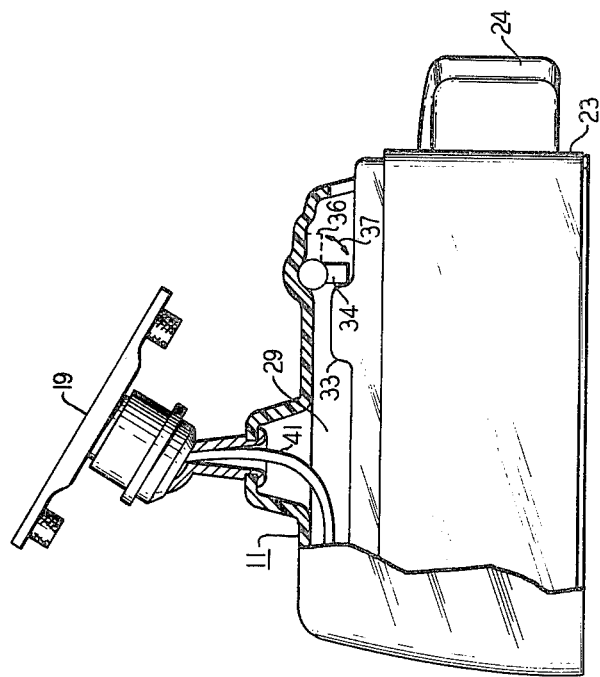
FIG. 3 is a side view of the mounting pedestal partially shown in section wherein the telephone set is in the stored position.

FIG. 3 depicts telephone set 23 within base 11. A partial section is taken of base 11 to provide an exposed view of the interior of receptacle 29. Telephone set 23 includes reinforced protrusion 33 which interacts with rotatable latch bar 34 of lock 31. Free insertion and removal of control unit 23 is provided when latch bar 34 is in the position shown by dashed lines 36. Control of the position of latch bar 34 is provided by rotating the key associated with lock 31 after insertion in keyhole 32 as indicated by dual directional arrow 37.

The position of latch bar 34 shown in FIG. 3 corresponds to the locked position. When control unit 23 is being stowed as shown in FIG. 3, removal of the telephone set cannot be accomplished without physically altering base 11 and/or lock 31. The toughness of the material of base 11 and its thickness is selected to provide the high degree of resistance to mechanical forces typically expected to be used by thieves. The object is not to make base 11 inpenetrable but to increase the time and effort required to remove control unit 23 and thereby discourage theft.

Figure 4:
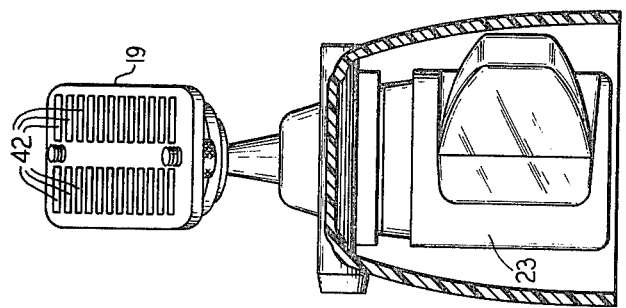
FIG. 4 is a front view of the arrangement of FIG. 3.

Cable 41 and contacts 42 are respectively made evident from the sectioning of FIG. 3 and the position of control unit 23 in FIG. 4. Cable 41 provides a multi-conductor electrical coupling between telephone set 23 and the remaining elements of the radio telephone equipment. Although not shown in FIG. 3, one end of cable 41 will exit base 11 at a convenient location compatible with the particular circumstances presented by installation in a vehicle. The other end of cable 41 is connected to multiple contacts 42 in the connector plate which mate with matching contact pads not shown but present in the bottom of telephone set 23.

The position of opening, or port, 28 in base 11 as shown in FIGS. 2-4 when mounted in a left sided driven vehicle faces the rear. Keyhole 32 will be to the right side of the driver. In some vehicles, it may be desirable to have port 28 face the front of the vehicle which may be readily accomplished without departing from the inventive principles. For front wheel driven vehicles without a center hump in the floor, stem 13 may be adapted to include an extension which would raise the position of telephone set, or control unit, 23 to a convenient height. These variations represent only a few of the many which may occur to those skilled in the art in utilizing these inventive principles.

Figure 5:
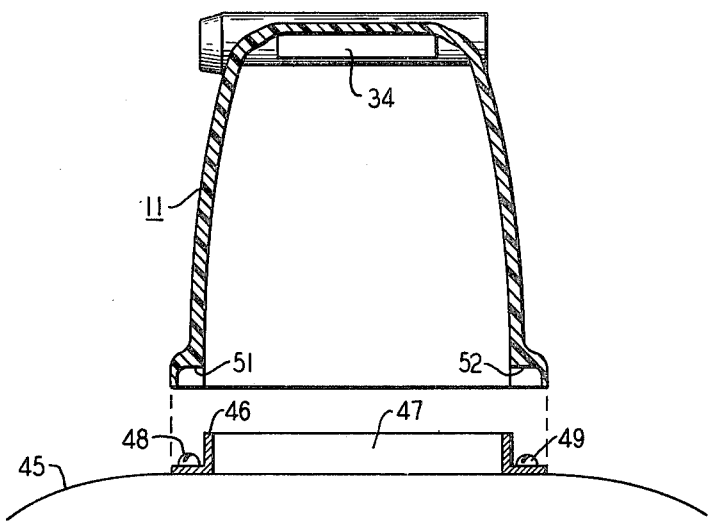
FIGS. 5, 6 and 7 are different sectional views depicting one arrangement for securing the pedestal to the floor of a vehicle.
Figure 6:
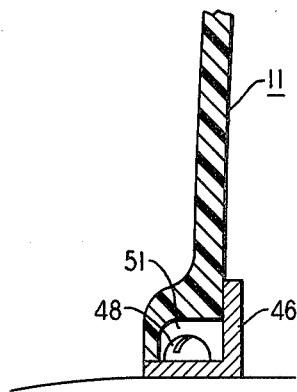
Figure 7:
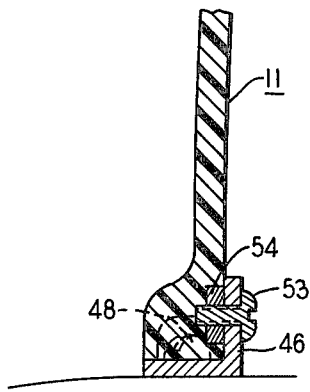

FIGS. 5–7 provide sectional views of base 11 to illustrate one of many typical arrangements for securing the base to floor 45 of a vehicle. In FIG. 5, base 11 is shown separated from mounting member 46, which is U-shaped to contact with the bottom of the sides and back of base 11. Portion 47 of member 46 is the bottom of the "U" as viewed between the cross sectioned sides. Member 46 is secured to floor 45 by a number of mounting screws represented by screws 48 and 49. In order for base 11 to conform with member 46 and screws 48 and 49 clearance is provided by the presence of cut-outs 51 and 52 as shown in FIG. 5.

FIG. 6 provides an enlarged cross section of base 11 in the vicinity of screw 48 through member 46. At this point, cut-out 51 in base 11 provides appropriate clearance for the head of screw 48. Utilization of this arrangement conceals the screws utilized to mount member 46 to floor 45 as represented by screws 48 and 49 in FIG. 5.

FIG. 7 depicts the manner of fastening base 11 to member 46. It should be understood that this sectional view is taken at a different location along the side of base 11 wherein screw 53 is inserted through a clearance hole in member 46 and into threaded fastener 54 which is molded into the material of base 11. Since screws such as screw 53 may be only accessed through port 28 of base 11, they are concealed and inaccessible from potential thieves when telephone set 23 is placed in interior 29 as shown in FIG. 3. Again it is to be pointed out that this particular arrangement is one of many possible variations that may be used by those skilled in the art to provide a secure mounting of base 11 to vehicle floor 45.

Although in FIG. 5 reference numeral 45 is utilized in reference to the floor of a vehicle, base 11 may be readily mounted on any planar portion of a surface in the vehicular passenger compartment. In vehicles incorporating bucket seat styling separated by consoles, for example, base 11 may be readily mounted to these consoles. In all cases, it is to be understood that the embodiment described herein is merely illustrative of the principles of the invention. Other possible variations may include a recessed connector plane instead of the butt connector 19 of FIG. 1. Further security may be readily provided by utilizing alarm arrangements which may be tripped by attempting to remove telephone set 23 from connector plate 19 or recess 29. Of course, various other modifications may also be made by persons skilled in the art without departing from the spirit and scope of the invention.

I claim:

1. A mount of the type which supports a telephone station set (23) for convenient operation by a user from a substantially planar portion of a surface (45) in a vehicle, the mount being characterized in that a base (11) is adapted for mounting on said planar portion and provides an interior cavity (29) to serve as a receptacle for said set, said base has a port (28) communicating with said interior cavity for insertion and removal of said set from said interior cavity, and locking means (31) is associated with said port for assuming a predetermined position to prevent removal of said net from said interior cavity of said base when said set is not being operated by the user, connecting means includes a connector plate (19) adapted to mate with said set to provide both mechanical and electrical coupling for said set, and support means (12, 13, 16, 17 and 18) mechanically locates said connector plate in a predetermined position, said support means is disposed between the exterior surface of said base and said connecting means and serves to provide the mechanical support and to complete the electrical connection for said set for operation by the user.

2. A mount in accordance with claim 1 wherein said base peripherally contacts said planar portion over a substantial area in relation to the overall height of said mount making said mount less susceptible to vehicular vibration.

3. A mount in accordance with claim 1 wherein said base is constructed of a resilient material to dampen the presence of any vibration at said support means due to the operation of said vehicle.

4. A mount in accordance with claim 2 wherein the size of said port is large enough to accommodate said station set including a handset in the cradled position.

5. A mount in accordance with claim 3 wherein the strength of said resilient material will yield in response to a predetermined range of impact forces experienced during vehicular accidents to reduce injury to the user or other passengers in said vehicle.

6. A mount in accordance with claim 4 wherein said support means comprises a mechanical ball and socket joint including means for locking said joint.

7. A mount in accordance with claim 6 wherein said connector plate mates with the underside of said set.

8. A mount of the type for at least supporting the control unit (23) of a mobile telephone station set for operation by a user from a substantially planar region of a surface (45) in a vehicle, the mount being characterized by a base (11) having an interior cavity (29) and a port (28) communicating therewith including locking means (31), said base serving to provide a secure stowage receptacle for said control unit when not being operated by inserting therein through said port and setting said locking means to prevent its removal, and adjustable support means (13 and 16-19) for positioning said control unit in a convenient position capable of operation, said support means extending from the exterior (12) of said base and including disengagable connecting means (19) adapted for mating with said control unit for electrical coupling therewith and to provide mechanical support.

9. A mount in accordance with claim 8 wherein said locking means comprises a rotatable latch bar (34) having a key controlled locked position and unlocked position, said latch bar obstructing the withdrawal of said control unit from said interior cavity when set to the locked position.

10. A mount in accordance with claim 9 further comprising an intermediate member (46) placed between the perimeter of said base and said substantially planar region, said intermediate member is secured to said substantially planar region by a plurality of first fasteners (48, 49) and secured to said base by a plurality of second fasteners (53) accessible solely through said interior cavity while the securing of said base to said intermediate member covers up and conceals said plurality of first fasteners from being accessed.

* * * * *